Figure 1:
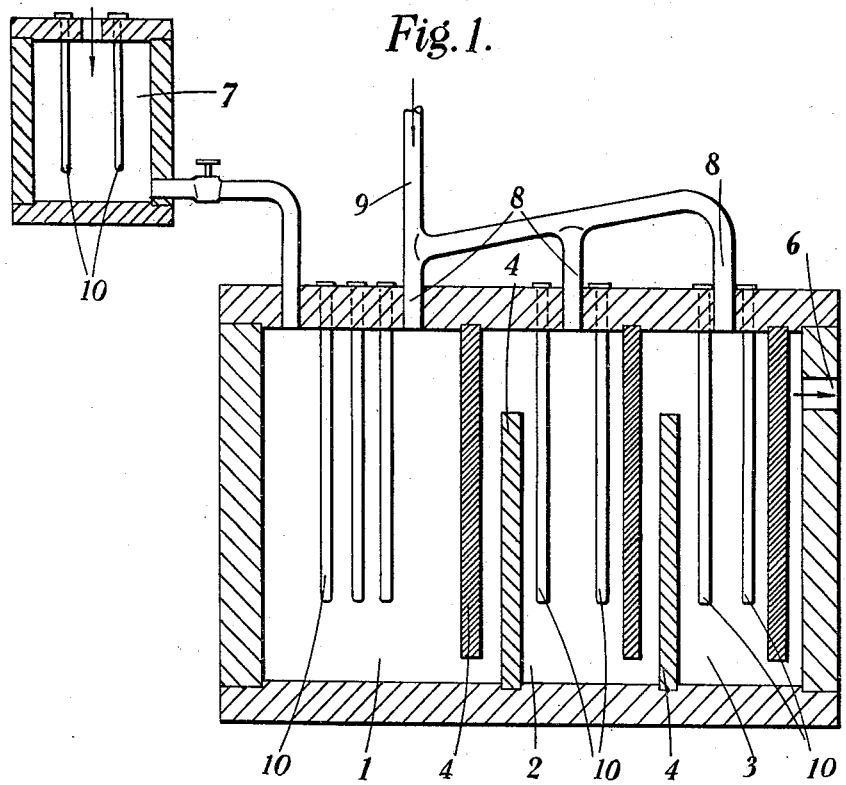

March 24, 1931.  G. MINKOFF ET AL  1,798,099

RECOVERY OF HYDROCHLORIC ACID

Filed Dec. 13, 1928

INVENTORS
G. Minkoff & M. Levy,
BY Langner, Parry, Card & Langner,
ATTORNEYS

Patented Mar. 24, 1931

1,798,099

UNITED STATES PATENT OFFICE

GREGOIRE MINKOFF AND MARCEL LEVY, OF GENEVA, SWITZERLAND, ASSIGNORS TO THE INTERNATIONAL SUGAR AND ALCOHOL COMPANY LIMITED, OF LONDON, ENGLAND, A BRITISH COMPANY

RECOVERY OF HYDROCHLORIC ACID

Application filed December 13, 1928, Serial No. 325,793, and in Great Britain December 21, 1927.

This invention relates to the recovery of hydrochloric acid in concentrated form from spent liquid containing the same by means of sulphuric acid which can be reconcentrated and used again.

The chief object of the present invention is to effect the recovery of hydrochloric acid and the reconcentration of the sulphuric acid in an improved and continuous manner with simpler and more easily controlled plant than that which has hitherto been used.

The process according to the present invention is characterized by treatment of the hydrochloric acid containing liquid in stages or zones of respectively increased or upwardly graded temperatures to the action of sulphuric acid of advantageously low concentration as for example initially about 70% strength.

The temperatures employed may be materially lower than those employed in prior hydrochloric acid recovery processes.

It is important to note that as the sulphuric acid of reduced concentration in the last stage or zone will be at its maximum temperature it is in an advantageous physical condition for economic re-concentration, as for example by reduced pressure treatment without further heating. Moreover after re-concentration it will still be hot and ready for re-use.

The operations may be carried out in a simple form of plant consisting for example of a series of vessels or generators of hydrochloric acid gas maintained at progressively increased temperatures, or in a single generator having zones or sections maintained at such temperatures, and a re-concentration unit for the sulphuric acid. The hydrochloric acid containing liquid may be supplied continuously to the first zone or section or to two or more thereof and traverse the zones or sections progressively while the sulphuric acid also traverses the same.

The hydrochloric acid gas liberated or driven off at each zone or section is conducted away and used or treated in any known manner and for any desired purpose.

Approximately 90% of the hydrochloric acid is recovered as pure gaseous hydrochloric acid in the first stage and the remainder of the hydrochloric acid contained in the mixture of acids is completely removed as gas in the further stages so that substantially only traces of hydrochloric acid remain in the resultant sulphuric acid sent to the re-concentrating unit of the cycle.

As an example of the manner of carrying out the invention but without implying any limitation to the apparatus or temperatures mentioned, it may be stated that in a triple chambered plant the temperatures may be maintained at about 108° C., 135° C., and 150° C. respectively, and the sulphuric acid of about 70% strength still hot, as coming from its re-concentrating unit, may be continuously mixed at say 85° C. in the first chamber with aqueous hydrochloric acid of about 20 to 35% strength, at a temperature of about 40° C. The acid delivered from the last chamber will be found to consist of sulphuric acid of about 60% strength owing to its dilution by the water taken up from the liquid hydrochloric acid and will contain only a very small amount of residual hydrochloric acid.

Figure 2:
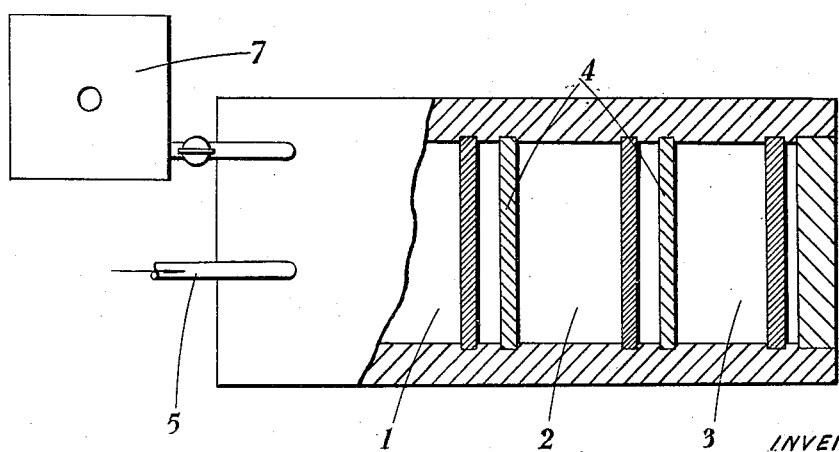

The accompanying drawings illustrate by way of example one embodiment of apparatus for carrying out the process, Figure 1 being a sectional elevation and Figure 2 a sectional plan. This apparatus comprises a vessel constructed of volvic lava or other suitable material contained in a case and insulated therefrom by acid-resisting cement. The vessel is divided into three zones or chambers 1, 2, 3, in series communication but separated from one another by means of baffles 4 also constructed of volvic lava or the like and disposed to maintain the same level of liquid in the three chambers. Sulphuric acid is admitted by the feed pipe 5 and after traversing the chambers escapes by way of the discharge opening 6. The hydrochloric acid containing liquid is stored in the vessel 7 and run therefrom into the chamber 1. From each of the chambers 1, 2, 3, an uptake pipe 8 extends to a common outlet 9.

The contents of the chambers 1, 2, 3, and of the vessel 7 are heated by heating elements 10, such for example as electric heating elements enclosed in silica tubes. The following are the details of an actual experiment:—
70% sulphuric acid at 85° C. was fed through feed pipe 5 into chamber 1 and the chambers 1, 2 and 3 were maintained at 108° C., 135° C. and 150° C. respectively. At the same time 29% hydrochloric acid at 40° C. was run at an appropriate rate from vessel 7 into chamber 1. The acid liquid leaving through the discharge opening 6 contained 0.01% hydrochloric acid and 62.5% sulphuric acid and could be re-concentrated under reduced pressure without further addition of calories to 70% acid still sufficiently hot for direct return to chamber 1. The hydrochloric acid gas escaping with a small quantity of water vapour through the uptake pipes 8 and outlet 9 were passed into a spiral condenser to remove all moisture and hydrochloric acid gas (100% acid) was obtainable at the outlet from the condenser.

What we claim is:—

1. In the process of recovery of hydrochloric acid in gaseous form from liquid containing such acid by means of sulphuric acid, the step of treating the acid-containing liquid with the sulphuric acid in three successive zones maintained at temperatures of about 108° C., 135° C. and 150° C., and drawing off the evolved gaseous hydrochloric acid from each zone.

2. In the process of recovery of hydrochloric acid in gaseous form from liquid containing such acid by means of sulphuric acid, the step of treating the acid-containing liquid with sulphuric acid of about 70% initial strength in three successive zones maintained at temperatures of about 108° C., 135° C. and 150° C., and drawing off the evolved gaseous hydrochloric acid from each zone.

3. The process of recovery of hydrochloric acid in gaseous form from liquid containing such acid, consisting in traversing the liquid in admixture with sulphuric acid of about 70% initial strength through three chambers in series communication maintained respectively at about 108° C., 135° C. and 150° C., leading off the gaseous acid from each chamber, withdrawing the sulphuric acid of reduced concentration, re-concentrating the acid and using it again.

In testimony whereof we have signed our names to this specification.

MARCEL LEVY.
GREGOIRE MINKOFF.